United States Patent
Clark et al.

(10) Patent No.: US 12,444,001 B2
(45) Date of Patent: Oct. 14, 2025

(54) VIRTUAL BUDGETING SYSTEMS AND METHODS

(71) Applicant: ProActive FinTech LLC, Pleasant Grove, UT (US)

(72) Inventors: Ryan Clark, Pleasant Grove, UT (US); Richard Holden, Pleasant Grove, UT (US)

(73) Assignee: ProActive Fintech LLC, Pleasant Grove, UT (US)

( * ) Notice: Subject to any disclaimer, the term of this patent is extended or adjusted under 35 U.S.C. 154(b) by 50 days.

(21) Appl. No.: 16/908,682

(22) Filed: Jun. 22, 2020

(65) Prior Publication Data

US 2020/0320642 A1 Oct. 8, 2020

Related U.S. Application Data

(63) Continuation of application No. 15/267,036, filed on Sep. 15, 2016, now Pat. No. 10,692,155.

(51) Int. Cl.
G06Q 40/12 (2023.01)
G06Q 20/10 (2012.01)
G06Q 20/34 (2012.01)

(52) U.S. Cl.
CPC ............ *G06Q 40/12* (2013.12); *G06Q 20/10* (2013.01); *G06Q 20/34* (2013.01)

(58) Field of Classification Search
CPC ....... G06Q 40/02; G06Q 40/12; G06Q 20/405
See application file for complete search history.

(56) References Cited

U.S. PATENT DOCUMENTS

| | | | |
|---|---|---|---|
| 7,707,105 B2 | 4/2010 | O'Neil | |
| 8,341,084 B2 | 12/2012 | Cowen | |
| 8,600,882 B2 | 12/2013 | Summerrow et al. | |
| 8,768,801 B1 | 7/2014 | Cheatham | |
| 9,495,703 B1 | 11/2016 | Kaye, III | |
| 9,589,266 B2 | 3/2017 | Pourfallah | |
| 11,449,859 B2 | 9/2022 | Isaacson et al. | |
| 2001/0049336 A1 | 12/2001 | Lin et al. | |
| 2014/0089191 A1 | 3/2014 | Brown | |
| 2015/0269559 A1 | 9/2015 | Inotay et al. | |
| 2016/0063494 A1 | 3/2016 | Madduri | |
| 2016/0321663 A1 | 11/2016 | Batlle | |
| 2016/0342992 A1 | 11/2016 | Lee | |
| 2017/0200158 A1 | 7/2017 | Honey | |
| 2018/0060867 A1 | 3/2018 | Hagan et al. | |
| 2020/0320642 A1 | 10/2020 | Clark et al. | |
| 2021/0174338 A1 | 6/2021 | Isaacson et al. | |

OTHER PUBLICATIONS

Mar. 2, 2023—Non-Final Office Action received from the USPTO—U.S. Appl. No. 17/954,277 (11 pgs).

*Primary Examiner* — Joshua T Kennedy
(74) *Attorney, Agent, or Firm* — Matthew D. Thayne; Thayne and Davis LLC

(57) ABSTRACT

Systems and methods for budgeting and/or spending control. In some implementations, a user may select a plurality of spending categories and/or an amount, such as a threshold amount, for a single, intended transaction on a mobile application or a web-based application. A debit card/spending account under the control of the user may then be activated and/or funds may be temporarily allocated to the debit card for the intended transaction. The debit card/spending account may automatically default to at least one of a zero balance and an inactive status other than when sufficient information is received prior to each intended transaction.

20 Claims, 13 Drawing Sheets

VIRTUAL BUDGETING SYSTEMS AND METHODS

CROSS-REFERENCE TO RELATED APPLICATIONS

This is a continuation of co-pending application Ser. No. 15/267,036, which was filed on Sep. 15, 2016 and titled "VIRTUAL BUDGETING COMPUTER PROGRAM PRODUCT, SYSTEM AND METHOD," which application is hereby incorporated herein by reference in its entirety.

BACKGROUND OF THE INVENTION

Field of the Invention

This invention relates generally to computer applications (also known as "apps") for budgeting financial resources, and more particularly relates to a system, method and web-based application for allocating financial resources across various categories and authorizing expenditures failing to exceed a predetermined threshold.

Description of the Related Art

There exist many computer program products in the art for retrospective allocation of expenditures already made into predetermined categories, including programs such as QuickBooks, Excel, and Quicken; but no efficient computer program products for allocating expenditures into predetermined categories before the expenditure is made, much less of authorizing the expenditure only in response to a predetermined spending threshold failing to be exceeded for the category into which the expense falls.

In today's world of electronic commerce, shoppers are barraged with print, ads, cost per click ads, billboards, and opportunities to spend discretionary income. Many individuals, businesses, spouses, travelers, and even municipalities overspend without regard as to what type of expenditure is being made until after the expense is paid. These individuals and organizations have no access to efficient means in the art of categorizing and pre-authorizing expenditures before they are paid. Most budgeting systems fail because they try and control, or account for, expenditures after they have been made rather than before. Further the time-tested cash budgeting methods of the past are becoming obsolete because our society is becoming cashless.

A system, method and computer program product are needed for imposing budget control constraints on users' financial resources, including allocating funds or credit across a plurality of categories associated with a type of expense, setting predetermined spending thresholds for each category, then categorizing/itemizing expenses into one of the plurality of categories and approving only expenses falling below the predetermined spending threshold.

SUMMARY

From the foregoing discussion, it should be apparent that a need exists for a virtual budgeting computer program product. The present invention has been developed in response to the problems and needs in the art that have not yet been fully solved by currently available apparatus and methods. Accordingly, the present invention has been developed to provide a computer program product in computer readable memory for controlling related expenditures collectively exceeding a predetermined threshold, the operations of the computer program product comprising: setting a predetermined spending threshold for each of a plurality of categories, each of the plurality of spending thresholds exclusively associated with a category, each of the plurality of spending thresholds comprising an integer indicative of a dollar amount; accepting from a user a fund transfer request comprising: an integer indicative of an amount of an intended purchase; and a category in which to categorize the intended purchase; reducing the spending threshold exclusively associated the category by the integer indicative of an amount of an intended purchase; temporarily allocating funds from a general account to a category account exclusively associated with the category in response to the spending threshold exceeding zero; and activating a credit card under the control of the user in response to the temporarily allocation of funds.

The computer program product may further comprise: automatically reallocating the funds from the category account to the general account after expiration a predetermined term; and deactivating a credit card under the control of the user in response to the automatic reallocation of funds.

The computer program product may further comprise activating a credit card under the control of the user in response to a geostatic location of the user coinciding with a geostatic location of an approved merchant through reference to an approved merchant list.

The predetermined term may be one hour. The user may define a number of the plurality of categories and a name for each of the plurality of categories. The computer program product may further comprise: aggregating the fund transfer request with previously authorized payments over a predefined interval within the category to produce a category sum; relaying the aggregating category sum to the user; and displaying the category sums for each category on a portable GUI.

The fund transfer request may comprise a user name and an account number. A computer-implemented method for controlling related expenditures exceeding a predetermined threshold is also provided, the steps of the method comprising: setting a predetermined spending threshold for each of a plurality of categories, each spending threshold exclusively associated with a category, each spending threshold consisting of an integer; wherein a sum of all predetermined spending thresholds is less than the a dollar balance in the general account; virtually allocating transaction funds from the balance to a virtual account exclusively associated with a category in response to receiving a fund transfer request from a user; virtually reallocating the transaction funds from the virtual account to the balance after expiration of a predetermined time without a change in an amount of funds allocated the virtual account; electronically activating a credit card under the control of a user in response to the amount of funds exceeding the payment authorization request.

The predetermined term may be less than one hour. A user may define a name for each of the plurality of categories.

The authorization request may comprise a virtual account number exclusively associated with the virtual account.

The computer-implemented method may further comprise: automatically reallocating the funds from the category account to the general account after expiration a predetermined term; and deactivating a credit card under the control of the user in response to the automatic reallocation of funds.

The computer-implemented method may further comprise activating a credit card under the control of the user in response to a geostatic location of the user coinciding with a geostatic location of an approved merchant through reference to an approved merchant list.

A system for controlling expenditures exceeding a predetermined threshold is also provided, the modules comprising: one or more processors; a computer readable memory accessible via a signal bearing medium by the one or more processors, the computer readable memory storing programming instructions; an allocator module configured to allocate funds across a plurality of virtual accounts; a setter module configured to set a predetermined spending threshold for each of a plurality of categories, each spending threshold exclusively associated with a category, each of the plurality of categories exclusively associated with one of the plurality of virtual accounts; a receiver module configured to electronically receive a payment authorization request comprising a requested payment amount; a categorizer module configured to categorize the authorization request into one of the plurality of categories; and an authorization module configured to deactivate a credit card in response to the requested payment amount exceeding a spending threshold for the categorized authorization request.

The authorization module may be further configured to deactivate a credit card in response to a merchant geolocated at geostatic location of the user failing to be listed in an approved merchant list.

These features and advantages of the present invention will become more fully apparent from the following description and appended claims, or may be learned by the practice of the invention as set forth hereinafter

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
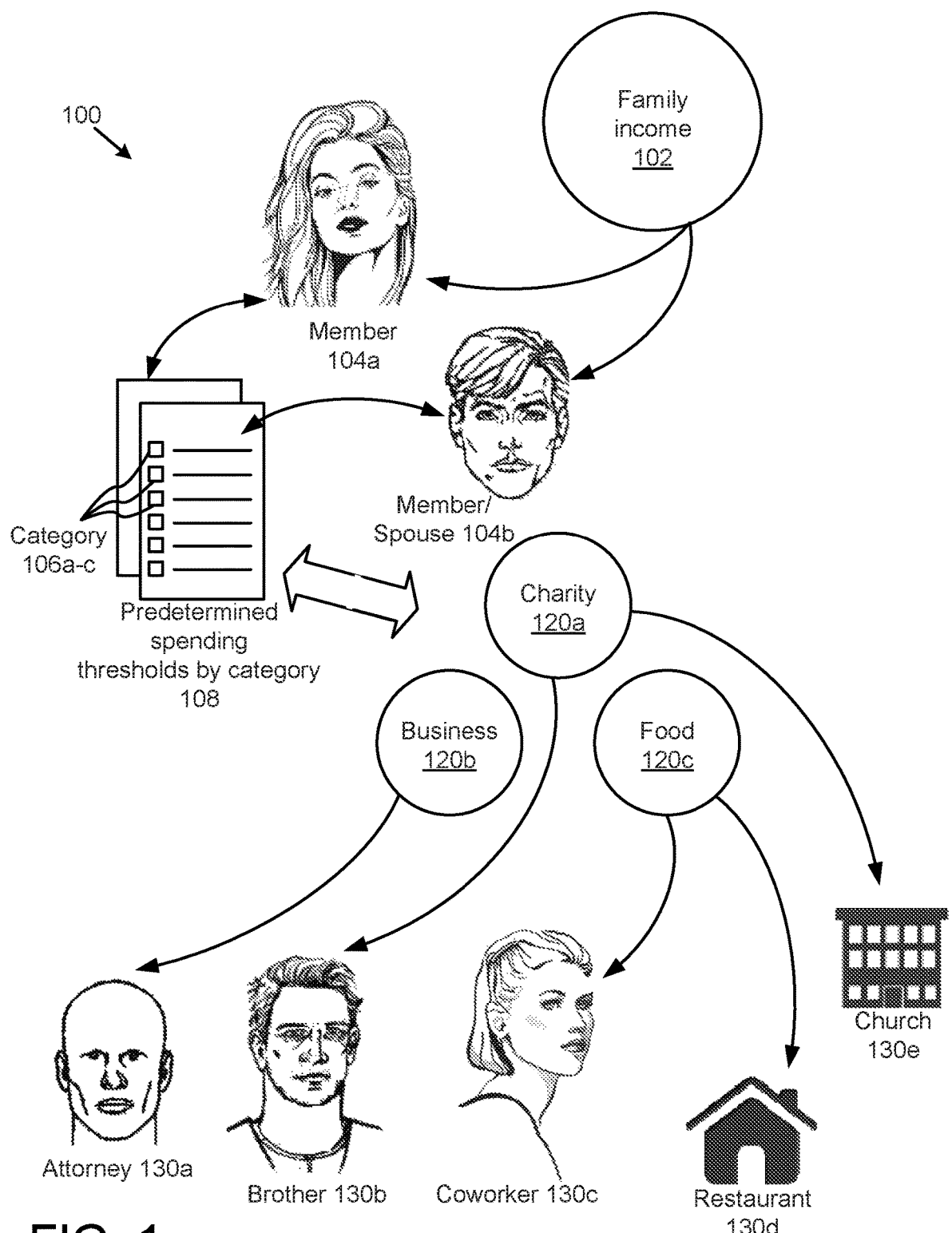
FIG. 1 is an entity-relationship diagram illustrating the relationship between inter alia members and vendors in accordance with an embodiment of the present invention.

FIG. 1 is an entity-relationship diagram illustrating the relationship 100 between shoppers, merchants and cost controls in accordance with an embodiment of the present invention.

Individuals or entities spending money in an economic system, including members who have registered with a computer program product, may comprise parents, spouses 104*b*, businesses, travelers, municipalities, and the like.

The members 104 derive income 102 from means known to those of skill in the art, including salaries, bonuses, derivatives, sales, grants, 1099 income, allowances, W-2 income, taxes, and the like. The total revenues or money that a member 104 receives from all sources over a predetermined interval, which interval is a month in most embodiments, is hereinafter the "funds" or "monthly income."

In various embodiments, the funds comprises revenue generating by a plurality of members 104, including spouses, family units, or other social structures or social organizations of individuals, including church members, pupils in a particular school or grade, members of a governmental entity, or a business seeking to control employee spending.

In the shown embodiment, member 104*a* and member's 104*a* spouse 104*b* both make use of a computer program product for virtual budgeting, or alternatively a method or system. One or both of the members 104 selects or otherwise identifies a plurality of categories 106 or (spending categories 106) into which each of a plurality of future expenditures will be categorized.

These categories 106 may be predefined and selected from a list, or may be defined by the members 104. Non-exhaustive examples of categories 106 include food, travel, office, personal, utilities, and miscellaneous.

In various embodiments, subclasses within each class are defined by the member 104 or alternatively defined by merchants 120 or vendors 120 interfacing with a system, computer program product 100, or method. Examples of subclasses may include food, housing, electronics, books, gifts, digital media, guns, lodging, office supplies, legal services, medical services, insurance, construction contractors, or the like.

The members 104 work together, or alone, to define spending budgets for each category 106. A list 108 of predetermined spending thresholds is created by the members 104, which includes a separate predetermined spending threshold exclusively associated with each category.

Like the members 104, the merchants 120 may comprise any person, company or organization that is potentially a merchant of another person, company, or organization.

All future expenditures, including bank transfers, credit card payments, and debit card payments, made by any member 104 are categorized into one of the categories 106 before the expenditure is authorized at a point of sale terminal, on a merchant account, or the like.

In the shown embodiment, members 104 are making (or attempting to make) payments to a charity 120a, legal services 120b, and food 120c using a credit card or debit card. The computer program product may act as the authorizing bank in some embodiments, authorizing the payments to the charity 120a, legal service provider 120b, and restaurant (e.g. food 120c) only if those payments when added to previously payments made within a single category 106 (over a predetermined interval) fall below the predetermined threshold for that category 106. In the preferred embodiment, however, the computer program product simply allocates virtual currency from the balance of a general account to virtual accounts exclusively associated with each category. Real currency is not transferred with any banking institutions, rather accounting is handled between virtual accounts.

The fees for legal services may include fees paid to an attorney 130a. Fees for charity 120a may include gifts to family members such as a brother 130b or church 130e, and fees for food 120c may include a lunch purchase for a coworker 130c, a payment to restaurant 130.

The charity 120a, business 120b, and food 120c are classes/categories 106 named and identified by a member 104. Each of these categories 120 may comprise subclasses or subcategories, for instance the charity 120a class may comprise: church, the homeless shelter, a university, and the like.

Figure 2:
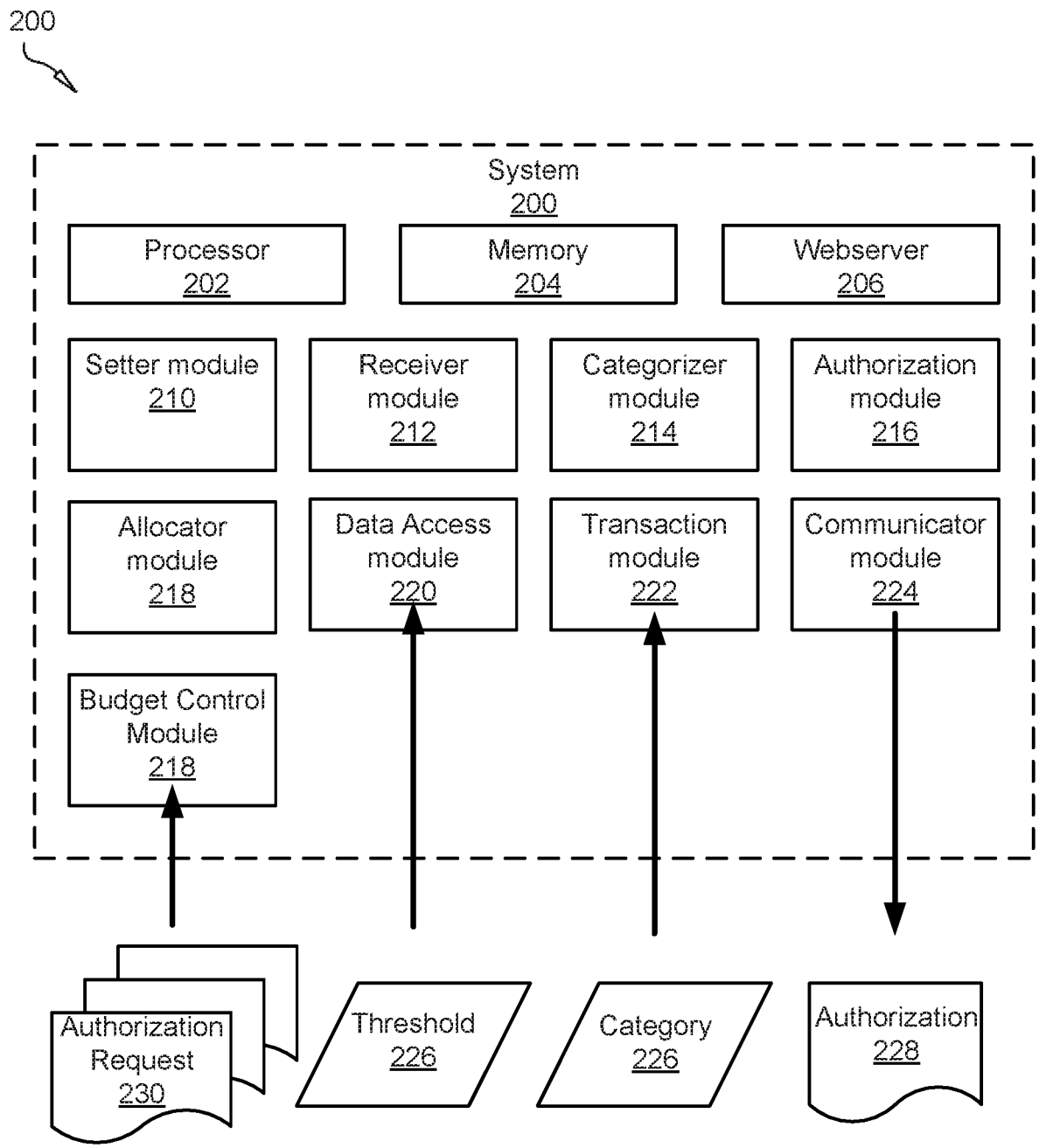
FIG. 2 is a block diagram illustrating the modules of a system for virtual budgeting in accordance with the present invention.

FIG. 2 is a block diagram illustrating the modules of a system for virtual budgeting in accordance with the present invention. The system 400 comprises a process 202, memory 204, a webserver 206, a setter module 210, a receiver module 212, a categorizer 214, an authorization module 216, a budget control module 218, a data access module 220, a transaction module 222, a communicator module 224, an authorization request 230, a threshold 226, a category 226, and an authorization 228.

The modules may be distributed over a computer network. The computer network can include one or more processors, indicated generally. Additionally, the computer network can include a computer readable memory, indicated generally, that is accessible by the one or more processors, the computer readable memory storing programming instructions for a virtual budgeting system. The programming instructions can implement the methods shown.

Additionally, the processors and computer readable memory can connect to a remote server, indicated generally, via a wireless access point. The remote server can contain data that either stores or processes the data to be used on a mobile handheld wireless computing device, indicated generally, for sending and receiving content to the virtual marketplace. The mobile handheld wireless computing device can include a mobile phone, a cellular phone, a satellite phone, a mobile handheld electronic organizer, a mobile electronic tablet, a laptop computer, any other internet-connected personal electronic device, and the like.

The setter module 210 may be configured to set a category and/or a predetermined threshold for each category. In various embodiments, the setter module 210 interfaces via a wide area network (WAN) with a browser on a tablet computer of a member 104 prompts the member 104 to textually enter a class name of a class 106. This class name is stored in computer-readable DBMS memory (database management system) and exclusively associated with an integer representing a spending threshold amount in dollars for said class 106 which cannot be exceeded by the members whose income forms the funds.

The receiver module 212 may receive an authorization request 230 from a third-party merchant. In various embodiments, a system 200 or computer program product 100 electronically approves merchant transaction requests from merchants or vendor 120. The computer program product 100 or system 200 acts for, or in place of, a merchant processor or originating bank in a credit card transaction.

In various embodiments, the funds are pooled in a general funds of the merchant processor under the control of the system 200 along with funds from other members 104 or groups of members 104. The merchant processor is known to those of skill in the art, and may comprise a processor such as Elavon®, PayPal®, or the like.

The categorizer module 214 may categorize authorization requests into one of the categories 106 chosen by a user or predetermined by a computer program product. The categorizer module 214 may also classify authorization requests into one of a plurality of subcategories which may be designated by a user 104, selected by the technology provider, or designated by the merchant requesting an authorization.

The authorization module 216 is configured to simply activate, or deactivate, a credit card under the control of a user 104, using means known to those of skill in the art.

The allocator module 218 may allocate money received at the beginning of a predetermined term from a user 104 into a general account across a plurality of subaccounts, each sub-account being exclusively associated with a category 106. The sum of all category 106 authorizations may not exceed the amount of the funds existing in the general account at the beginning of the predetermined term.

Figure 3A:
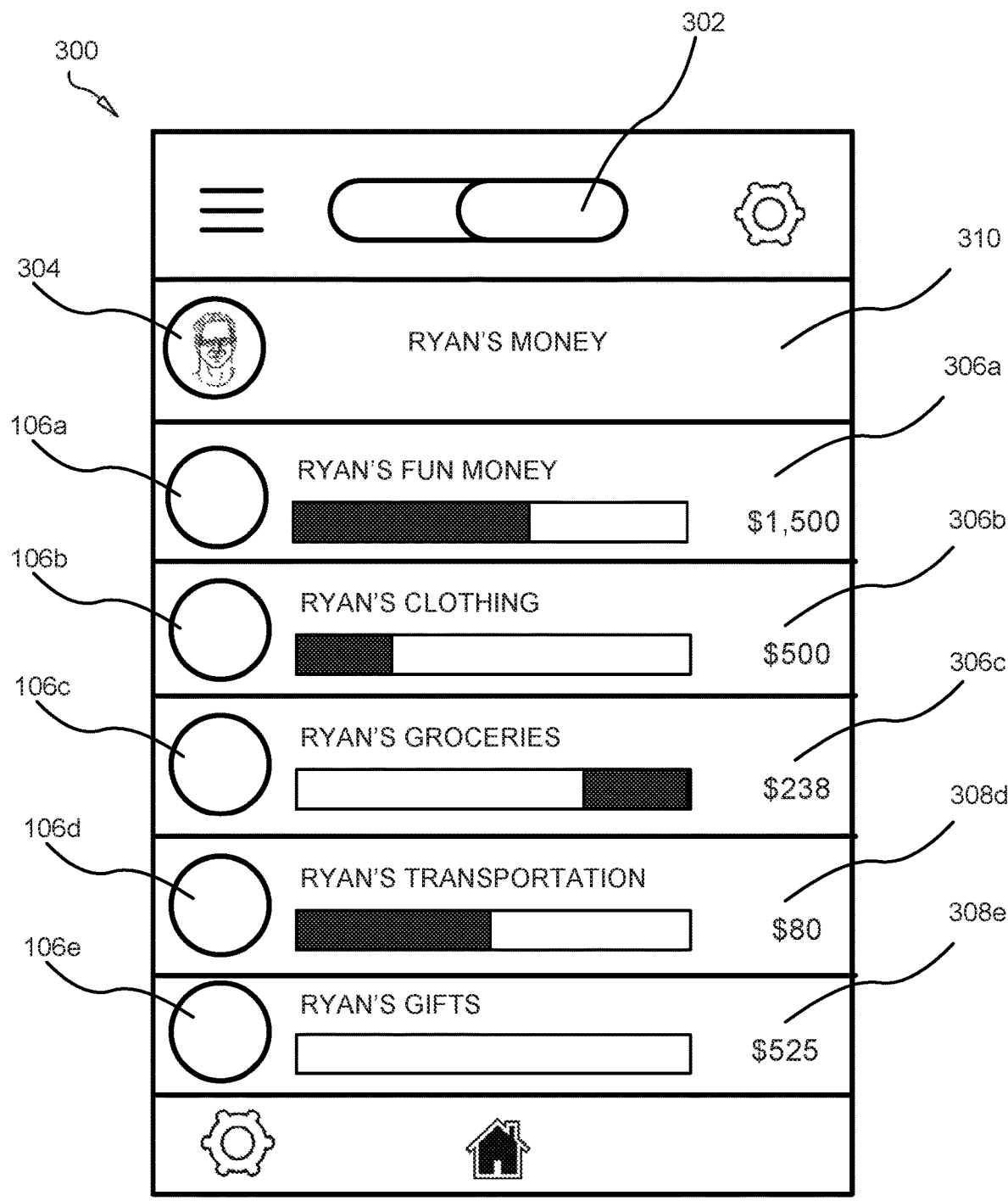
FIG. 3A depicts the display and virtual controls of a computer application in accordance with the present invention.

FIG. 3A depicts the virtual controls of a computer application in accordance with the present invention.

A computer program product may be designed to implement the steps of the methods or systems taught herein. This computer program product may run as an application or "app" on a mobile phone or tablet computer.

The computer program product may prompt a user to enter a PIN for access to the program, then may show the categories 106 of expenditures chosen by the categorizer module 214.

In various embodiments of the present invention, members 104 are required to make expenditures or purchases using a card at a point of sale terminal at merchant 120 locations. It is one object of the present invention to provide a system 200 which is configured to automatically reject purchase attempts by a consumers/members 104 in which a purchase authorization request does not contain a class 106. In short, unless the member 104 categorizes a purchase before making said purchase, into a class 106, the purchase authorization will be declined.

In various embodiments, the money allocated to each class 106 is zero. Members 104 are required to move money digitally using a browser on a tablet computer from a general account to an account for the class 106 in which the member 104 wishes to make a purchase. This transfer must be made by the member 104 within a predetermined period before the purchase, usually only a few minutes or an hour, before the system 200 automatically transfers the money allocated to the class 106 back to the general fund.

In configuring the system 200 in this fashion, an emotional impediment is created for the member 104 before purchasing. The member 104 may allocate funds for each purchase made, and must identify a class 106 for each purchase made, all before the purchase is realized.

These aggregated payments authorized by categories 106 may be shown is a line graph, pie graph or other graphical representation, as well as the amount still available under budget for each category 106, all over a predetermined interval such as a week, month or year.

As shown in FIG. 3A, each class 106 may be itemized in a browser of a member 104, which browser is interfacing with a central server forming part of the system 200. The name selected by the member 104 for each class 106 is displayed with an icon representing the class 106, along with a bar graph displaying expenditures to date during the predetermined interval (usually a month) in connection with each class 106.

The total expenditures 306 for each class are also shown.

Figure 3B:
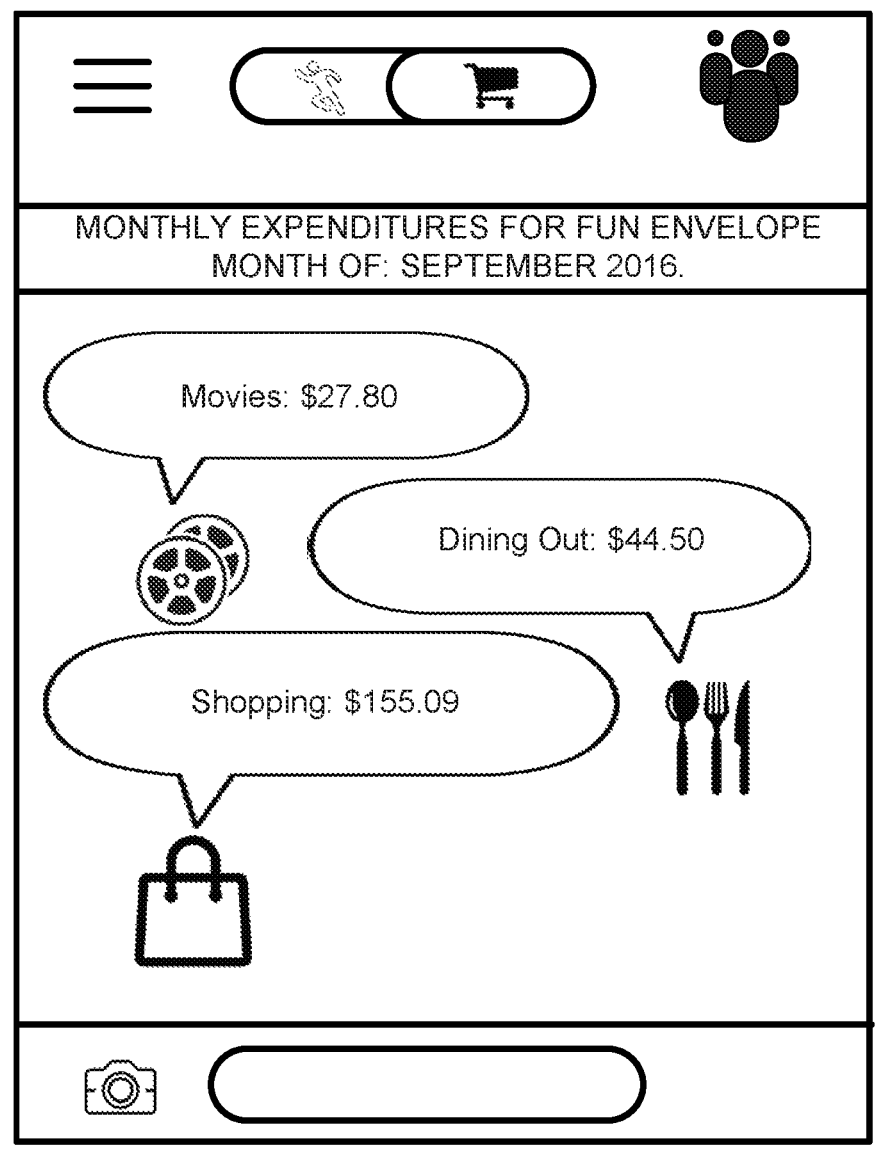
FIG. 3B depicts the display and virtual controls of a computer application in accordance with the present invention.

FIG. 3B depicts the display and virtual controls of a computer application in accordance with the present invention.

Total expenditures for each class 106 are displayed graphically in an exemplary embodiment of a browser. The classes 106 are represented by icons and identified by name.

Figure 3C:
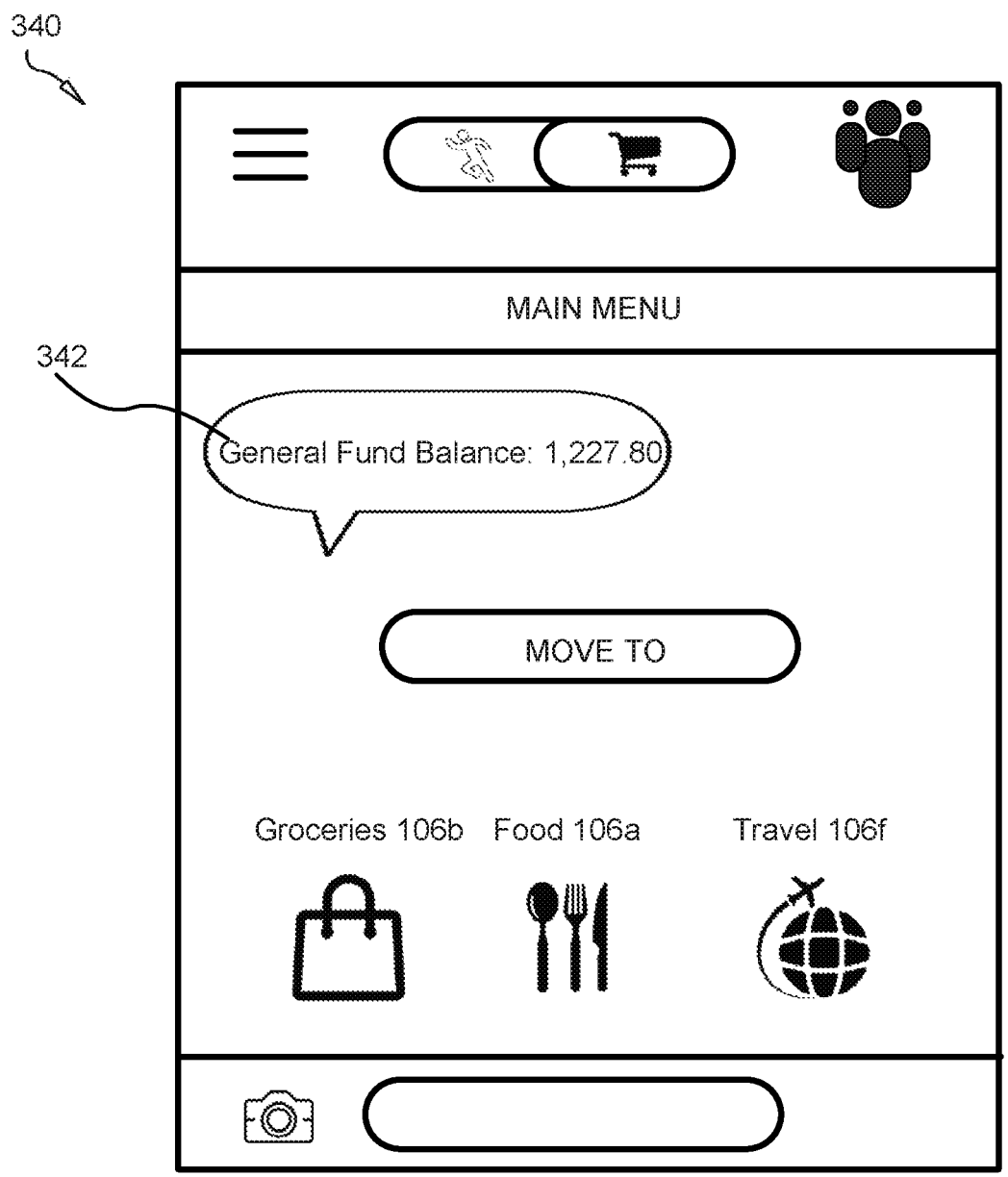
FIG. 3C depicts the display and virtual controls for allocating money of a computer application in accordance with the present invention.

FIG. 3C depicts the display and virtual controls for allocating money of a computer application in accordance with the present invention.

As shown, a general fund balance of $1,227.80 is shown and virtual controls are provided enabling a member 104 to allocate money from the general account 142 to the classes 106b, 106a, 106f.

Figure 4:
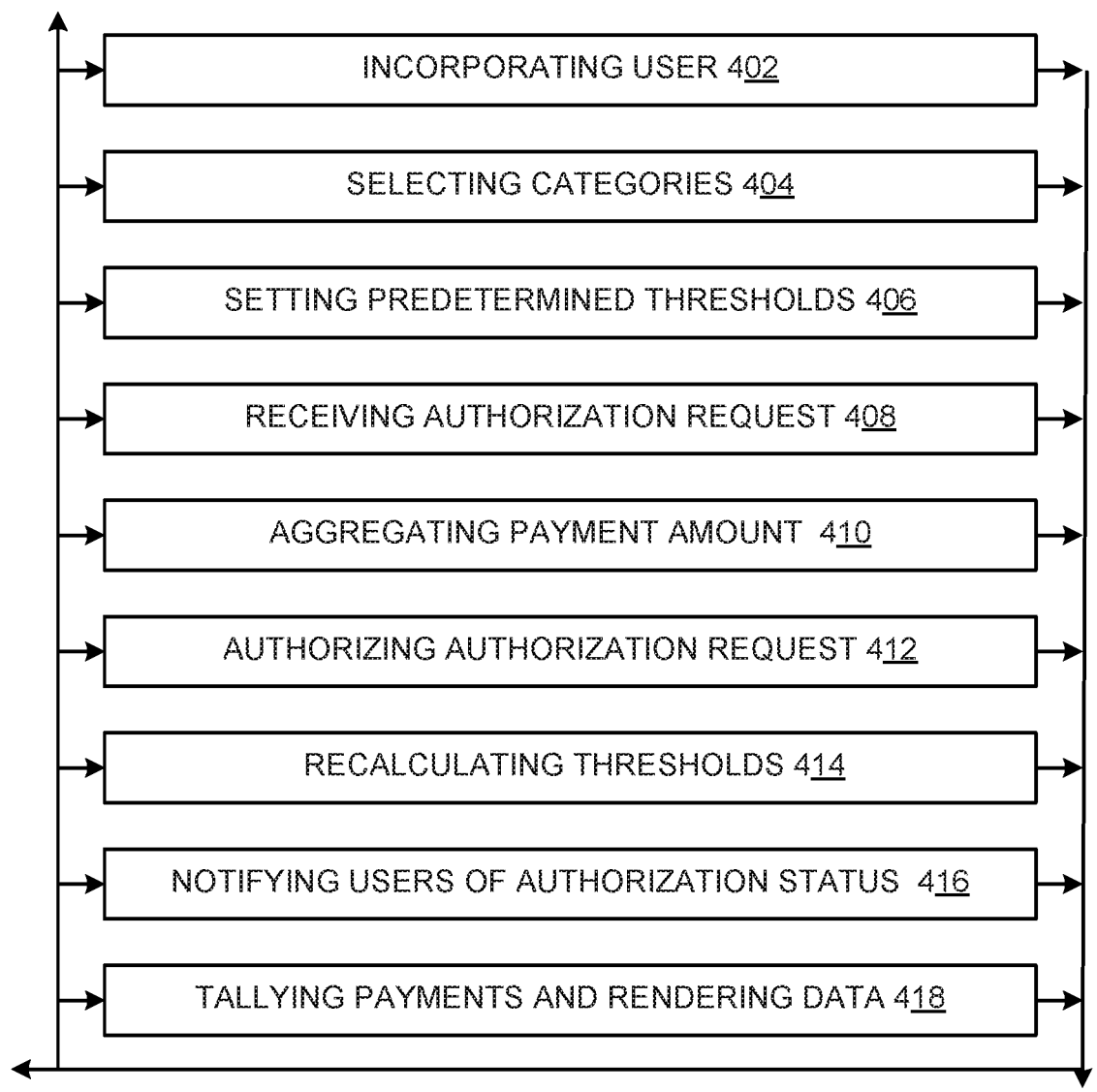
FIG. 4 is a flow chart showing the steps of a method of virtually budgeting funds in accordance with the present invention.

FIG. 4 is a flow chart showing the steps of a method 400 of virtually budgeting funds in accordance with the present invention.

Users, including members 104, may be incorporated 402 into a system 200 or computer program product. These users or members 104 may select 404 categories 106 and set 406 predetermined thresholds for those categories 106.

Members 104 become incorporated when they create accounts with the server by uploading personal identifying information, including one or more of address, email address, telephone number, purchasing practices, and the like. In typical embodiments, the registration takes place via a browser, but may also be sent to the server using programs well-known to those of skill in the art, such Microsoft Outlook, Thunderbird, Yahoo! Mail, and the like.

The system 900 comprises a server 902, a database management system (DBMS) 904, persistent storage 906, stored consumer requests 908, stored historical data 110, a wireless network 912, a consumer 918, providers 914a-b, a computer 918b, a merchant processor 919, a consumer request 920, and payment data 922.

Typically, the server comprises one or more central processing units executing software and/or firmware to control and manage the other components within the system. In one embodiment, the server comprises hardware and/or software more commonly referred to as a Multiple Virtual Storage (MVS), OS/390, zSeries/Operating System (z/OS), UNIX, Linux, or Windows system.

The server may comprise a server cluster with firewalls, load balancer, and database servers having Apache® and/or other software applications well-known to those of skill in the art. The server, in the shown embodiment, comprises a database management system (DBMS) or relational database management system (RDBMS), such as Oracle, MySQL, SQL, FireBird, IBM DB2®, or the like.

Authorization requests 130 are received 408 by the receiver module 212. These authorization requests 130 are authorized or denied by the authorization module 216.

Expenditures in each class 106 are aggregated 410 and new authorization requests which exceed the predetermined threshold for said class 106.

In various embodiments, at the end of a predetermined period, if there is a remaining balance in the general fund 342, the predetermined thresholds or predetermined spending thresholds for each class 106 may be automatically adjusted in accordance with a remainder adjustment criteria. In some embodiments, remaining revenue is rolled over into a subsequent month, into a savings account, or in other embodiments the remaining revenue is divided and allocated pro rata based on the original thresholds over the classes 106.

The predetermined thresholds may be recalculated 414 to show the available credit, balance, or credit for each category 106.

Figure 5:
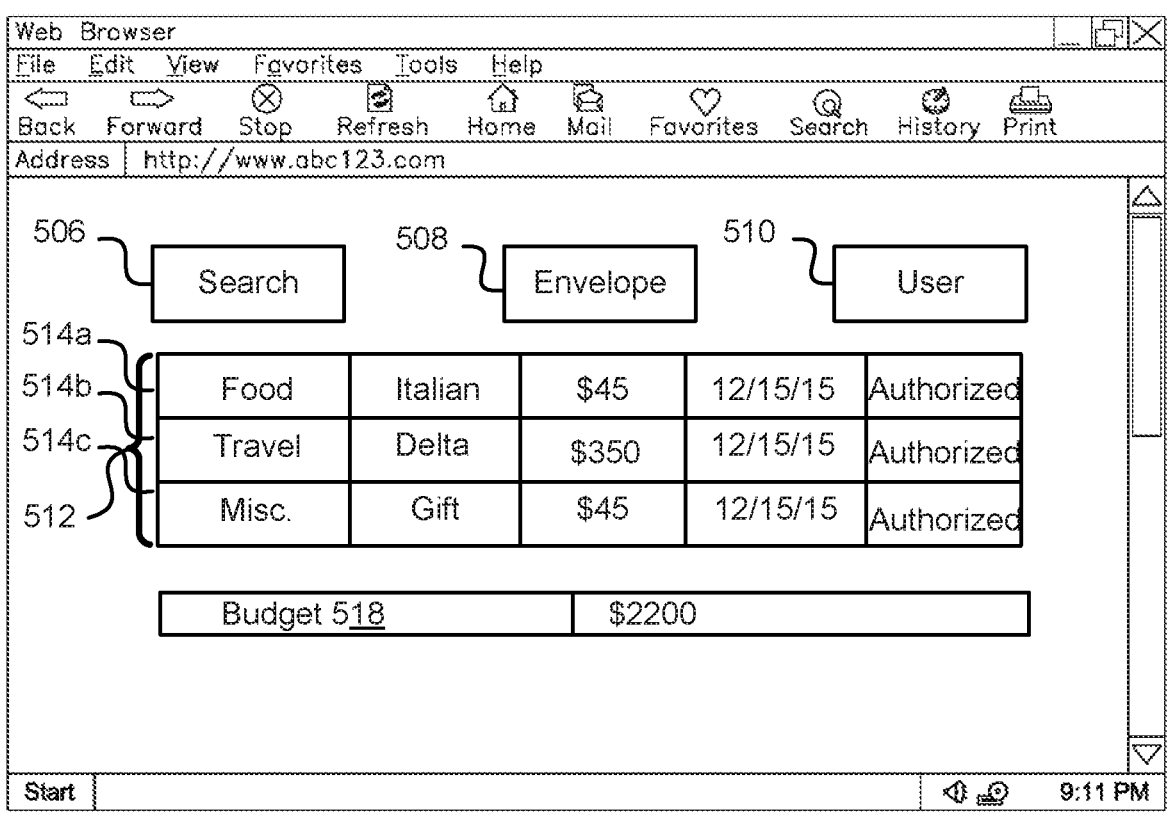
FIG. 5 illustrates a browser with virtual controls for virtually budgeting funds in accordance with the present invention.

FIG. 5 illustrates a browser with virtual controls for virtually budgeting funds in accordance with the present invention. The shown embodiment illustrates, more specifically, historical data associated with three categories 106. The shown categories 106 in this instance consists of a food 514a, travel 514b, and misc. 514c. Each of these categories 514-ac shown a subcategory into which an expense was previously classified. In this instance "Italian" is the subcategory of food 514a showing a payment of $45 dollars on the specified date of Dec. 15, 2015. This payment was authorized.

Virtual controls 506-512 are shown on a web browser in accordance with the present invention. The display and virtual controls may comprise a search button, categories 106, authorization request statuses, and the like. These virtual controls allow a user/member 104 to view historical data.

Payments by category 106 may be shown in the browser as shown, with payment authorized shown in matrix fashion.

Figure 6:
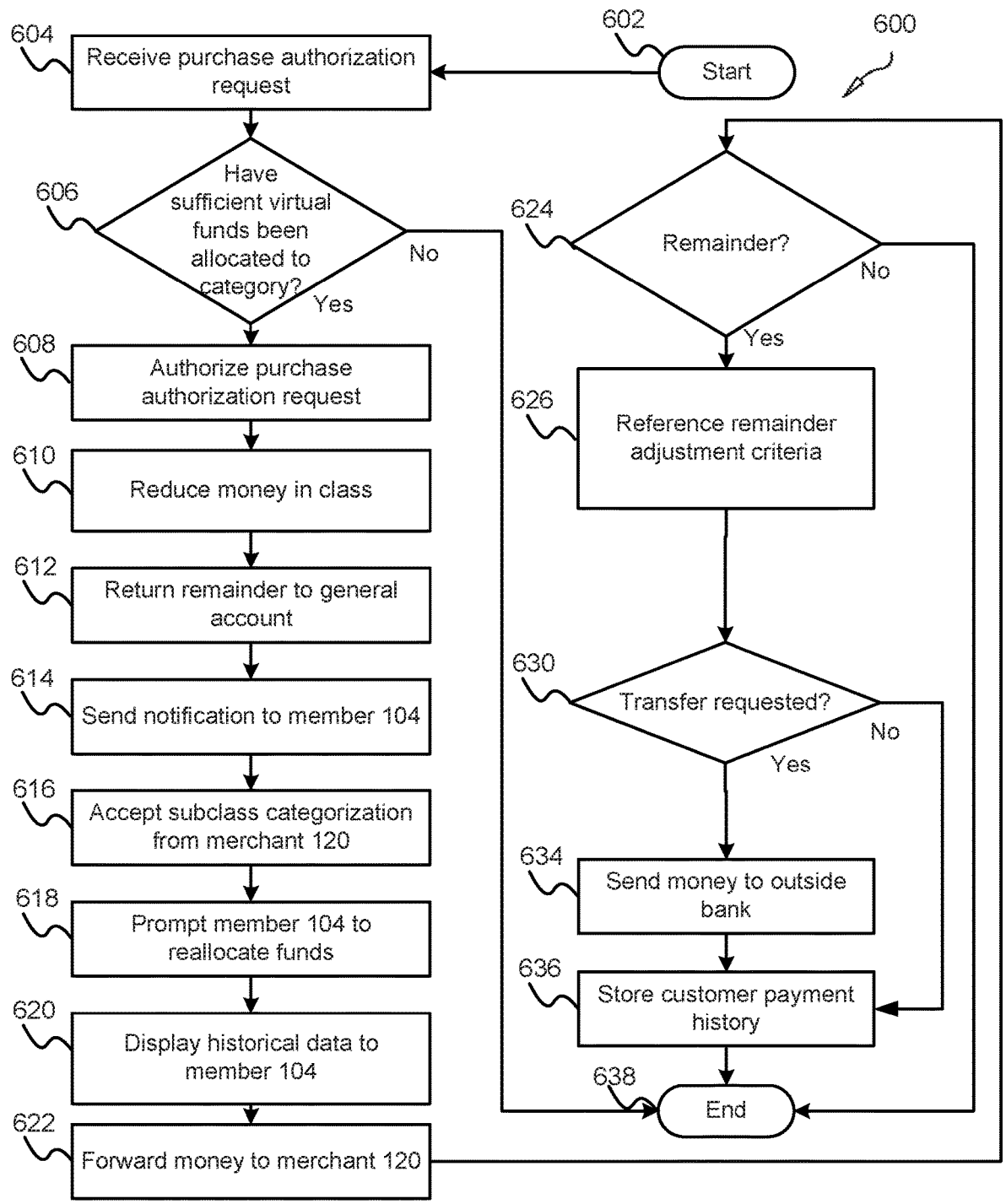
FIG. 6 is a flow chart showing the steps of a method of virtually budgeting funds in accordance with the present invention.

FIG. 6 is a flow chart showing the steps of a method 600 of virtually budgeting funds in accordance with the present invention.

The method begins 602 when a purchase authorization request is received 604. This request may be received from a merchant; or, in alternative embodiments, a credit and/or debit card is simply authorized, activated or deactivated in place of step 604. For the purposes of this disclosure, the terms "credit card" and "debit card" are used synonymously.

A check is performed 606 to determine with sufficient funds have been allocated to a category 106 within the purchase described in the request is classified or categorized. If proper funds have been allocated, the request is authorized 608 and the money allocated to the category 106 debited for the purchase amount. Unused funds associated with the category 106 may be automatically returned 612 or reallocated to a general account under the control of the technology provider.

The member 104 receives 614 a notification from the technology provider, and may be prompted to accept 616 a subclass into which the request will be classified. The member 104 is then prompted by the computer program product and/or technology provider to reallocate 618 funds for another purchase.

Historical data may be displayed 620 and money forwarded to a merchant 622 in some embodiments, though not in others.

If, at the end of the predefined terms, which is usually a month, money remains 624 in the general account exclusively associated with a member 104, the technology provider may allocate this money in accordance with a remainder adjustment criteria, including remitting the money to a savings account, 401(k), mutual fund, checking account, the IRS, or the like.

If a transfer is requested 630 by the user 104, the remaining funds may be sent 634 to an outside bank and the transaction recorded or stored 636 in computer-readable memory before the method 600 ends 638.

Figure 7:
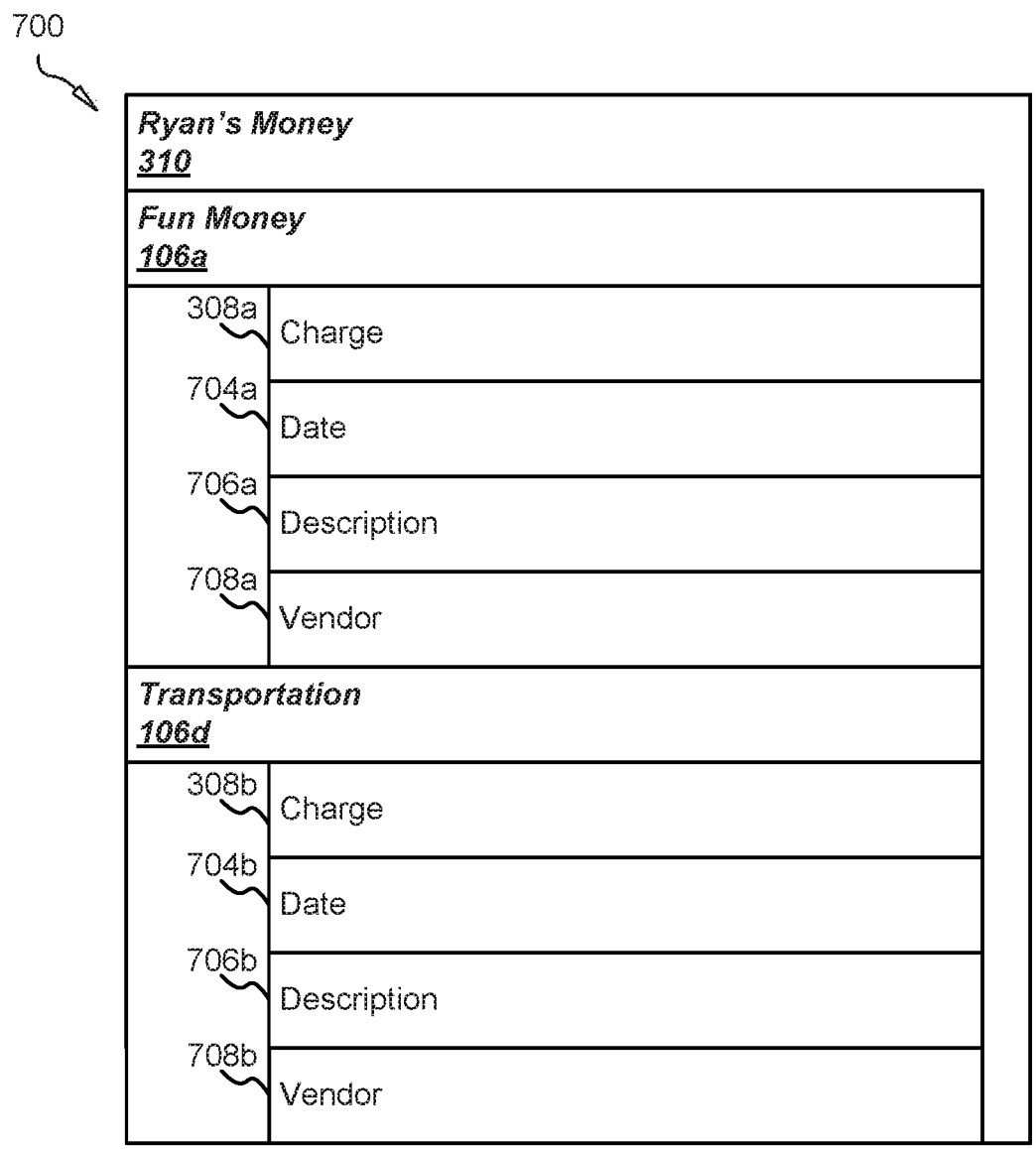
FIG. 7 illustrates a computer-readable DBMS file showing historical data of virtually-budgeted funds in accordance with the present invention.

FIG. 7 illustrates a computer-readable DBMS file 700 comprising historical data of virtually-budgeted funds in accordance with the present invention.

The computer file 700 comprises a packet for Ryan's money 310, which packet 310 comprises categories 106, expenses associated with those categories 106, and transaction data for each expense, 308, 704, 706, 708. This transaction data may comprise a charge amount, a date of a purchase, a description of the purchase or merchant, and vendor or merchant name.

Figure 8A:
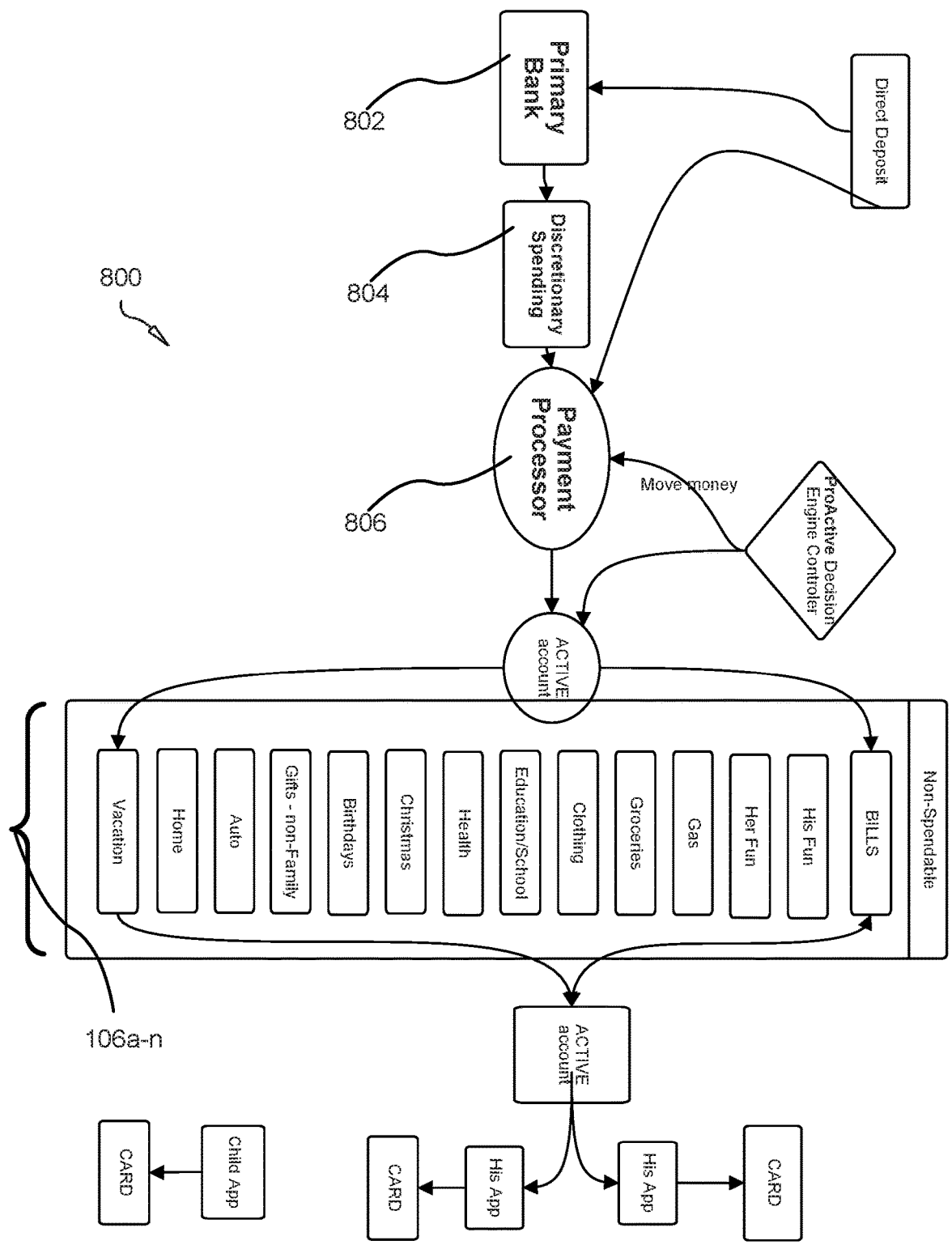
FIG. 8A is an entity-relationship diagram illustrating the relationship between system entities in accordance with an embodiment of the present invention.

FIG. 8A is an entity-relationship diagram illustrating the relationship between system entities in accordance with an embodiment of the present invention.

Money is direct deposited into a primary bank 802. A portion of this money consisting of the discretionary spending portion 804 is transferred to a payment processor 806. This money may be allocated over a plurality of categories 106*a-n* which are shown.

If an account for a particular user 104 is active, a credit card is activated for a user 104; or, in some cases, the family member of a user 104, including a child.

Figure 8B:
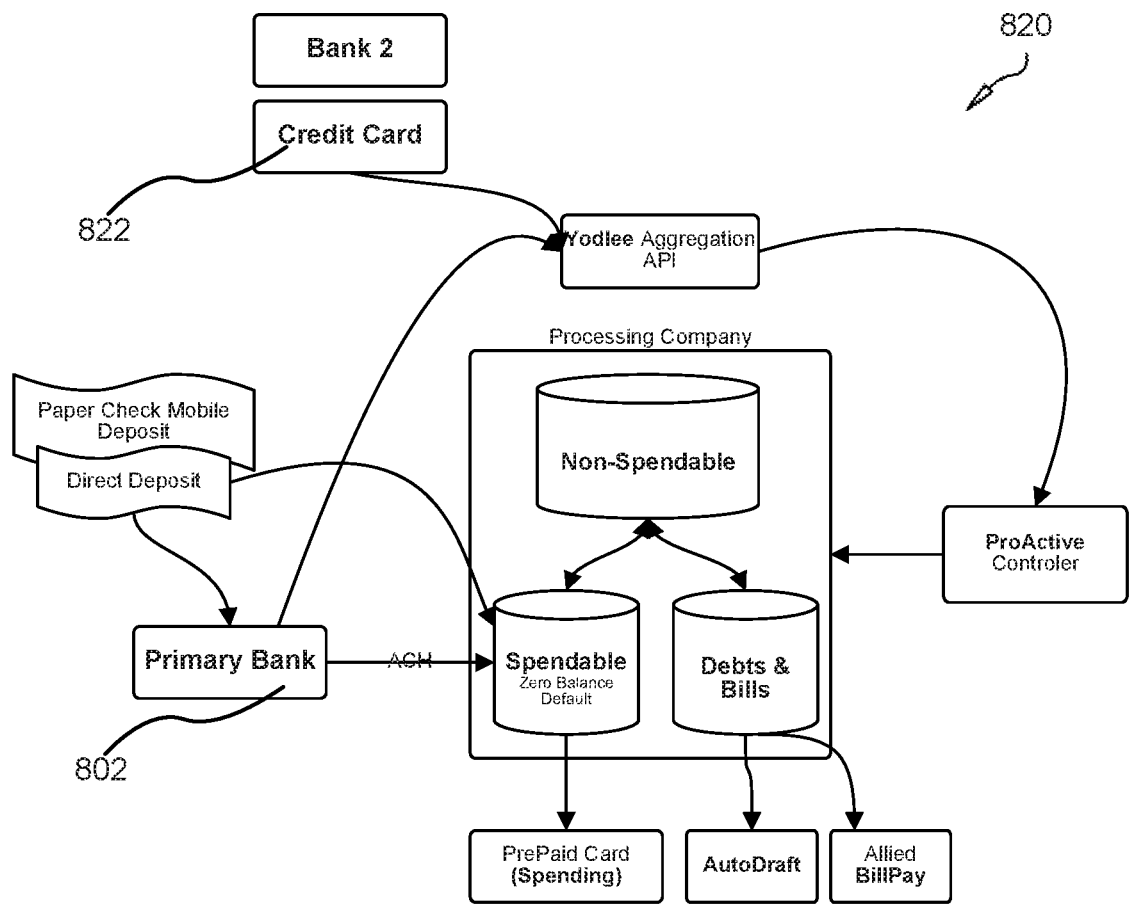
FIG. 8B is an entity-relationship diagram illustrating the relationship between system entities in accordance with an embodiment of the present invention.

FIG. 8B is an entity-relationship diagram illustrating the relationship between system entities in accordance with an embodiment of the present invention.

A credit card 822 may be activated in response to money being deposited with the primary bank 802, which money may be allocated as spendable, non-spendable, and fixed (or debts & bills as shown). The technology provider may remit funds to third parties for the fixed portions of the money, and may remit funds to a non-spendable account such as 401(k) in accordance with a predetermined remittance criteria. Any funds remaining are classified as spendable and used, in some embodiments, to activate a prepaid credit card.

Figure 8C:
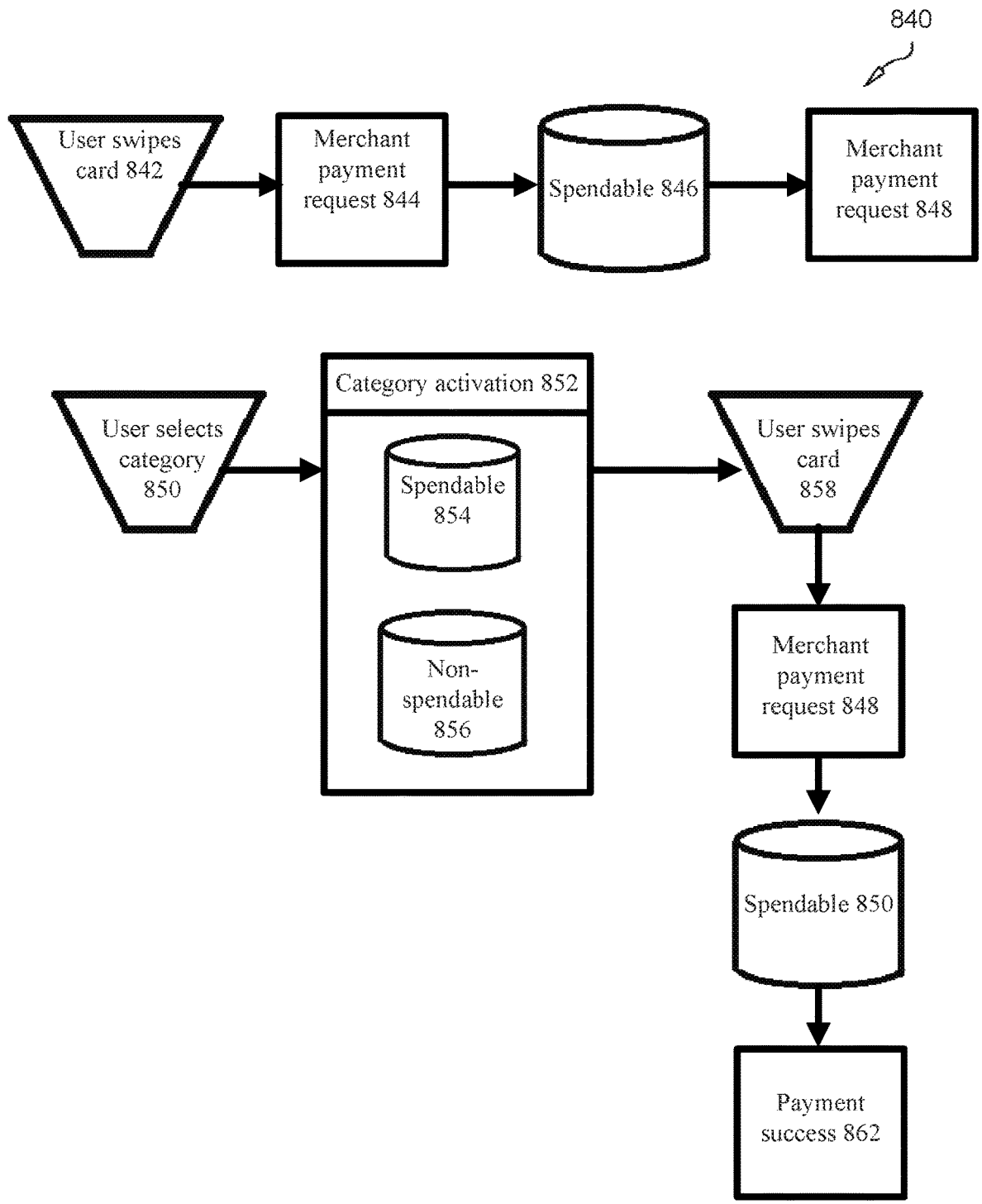
FIG. 8C is a flow chart illustrating a dual account method for controlling related expenditures collectively exceeding a predetermined threshold in accordance with an embodiment of the present invention.

FIG. 8C is a flow chart illustrating a dual account method 840 for controlling related expenditures collectively exceeding a predetermined threshold in accordance with an embodiment of the present invention.

A user 104 swipes 842 a credit card 822 initiating 844 a merchant payment request with is stored 846 in computer-readable memory. A user 104 also selects 850 a category 106. The user 104 may designate the category 106 as spendable 854 or non-spendable 856. The user 104 may allocate funds to spendable accounts 854.

Figure 8D:
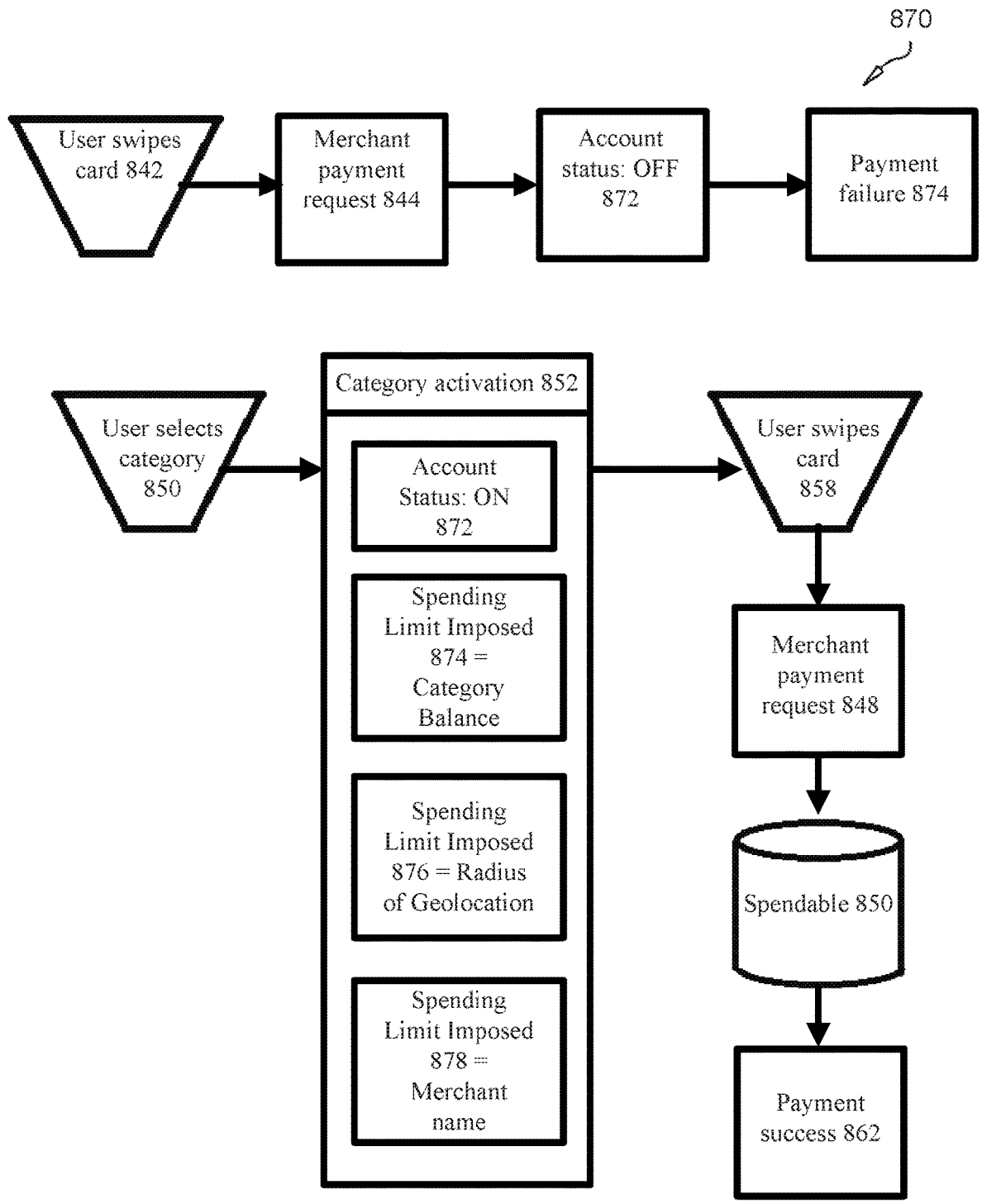
FIG. 8D is a flow chart illustrating a single account method for controlling related expenditures collectively exceeding a predetermined threshold in accordance with an embodiment of the present invention.

FIG. 8D is a flow chart illustrating a single account method 870 for controlling related expenditures collectively exceeding a predetermined threshold in accordance with an embodiment of the present invention.

In the method 870, an account status 872 may be turned to, or designated, as OFF. This causes all attempts by a user 104 to authorize a credit card 822 to fail 874. The account status may be Boolean variable in computer-readable memory evaluated as true for an account with an ON status and as false for an account with an OFF status. The account status may also comprise any other data type known to those of skill in the art.

In the shown embodiment, when a user 104 designates a category 106 as spendable 854, the account status 872 for the designated category 106 is turned to ON. The user 104 also has the option, or is prompted to, identify or designate in some embodiments a spending limit 874 for this category which is equal to or less than a category balance in a general account exclusively associated with the user 104.

The user 104 may additionally or alternatively designate a spending limit 876 which is geographic in scope and which prevents expenditures in said category 106 outside of a preset radius from a center point. The center point may be a user's 104 residence or present location, and may be expressed in global positioning system (GPS) coordinates as known to those of skill in the art.

Additionally or alternatively, the user 104 may designate a spending limit 878 which prevents expenditures at merchants non on a preapproved list of qualifying merchants. This list may be stored in computer-readable memory under a DBMS and the merchants may be designated by name, address, or a unique identifier.

It is an object of the present invention to set forth two approaches in which a purchase may be approved which is initiated by a user 104: (1) the first is by moving funds temporarily into a subaccount exclusively associated with a category 106, then moving those funds out and reducing the balance to zero after a predetermined interval has expired; and (2) instructing a bank to activate or deactivate a credit card.

In accordance with the first of these approaches, the balance of the subaccount is kept at zero except for those temporary intervals of time in which funds are placed in it before being spent or reverting back to the general account originating the funds.

In accordance with the second of these approaches, the credit card is defaulted to an inactive, or deactivated, status (or OFF status 872). The credit card is only activated for a predetermined intervals of time sufficient to allow a user to make an authorized purchase, and even then the purchase is subject to limitations described above, including geographic limitations and/or merchant name limitations and/or price limitations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for controlling spending, the method comprising the steps of:
receiving from a user at a server a plurality of spending categories, the server comprising one or more central processing units;
receiving a plurality of payment authorization requests from the user, wherein at least a subset of the plurality of payment authorization requests comprises an amount of an intended transaction and a category from the plurality of spending categories in which to categorize the intended transaction, wherein both the category and the amount relating to the intended transaction are manually entered by the user on a mobile application or a web-based application under the control of the user, and wherein each of the plurality of payment authorization requests is received from the mobile application or the web-based application;
in response to receipt of a payment authorization request comprising a manually entered category and an amount relating to an intended transaction from the user, temporarily activating a non-temporary debit card under the control of the user and/or temporarily allocating funds to the debit card for the intended transaction, and
in response to receipt of a payment authorization request lacking a manually entered category or an amount of an intended transaction, declining the intended transaction,
wherein the debit card automatically defaults to a zero balance and/or an inactive status other than for payment authorization requests comprising both a category and an amount of each intended transaction such that the debit card is only activated for temporary intervals of time following receipt of a payment authorization request comprising a category manually selected by the user.

2. The method of claim 1, further comprising receiving from the user a predetermined spending threshold for at least one of a plurality of spending categories.

3. The method of claim 1, wherein the step of temporarily activating a debit card under the control of the user and/or temporarily allocating funds to the debit card for the intended transaction comprises temporarily activating a debit card under the control of the user and/or temporarily allocating funds to the debit card for the intended transaction for a predetermined time period.

4. The method of claim 3, wherein the predetermined time period is no more than one hour.

5. The method of claim 4, wherein the predetermined time period is one hour.

6. The method of claim 3, further comprising, following the predetermined time period, automatically deactivating the debit card to prevent the intended transaction from entering.

7. The method of claim 1, wherein the payment authorization request comprises use of a virtual account number associated with a virtual account.

8. A method for controlling spending, the method comprising the steps of:
receiving a plurality of payment authorization requests from a user, wherein at least one of the payment authorization requests comprises a category manually selected by the user from a plurality of spending categories in which to categorize a single intended transaction comprising one or more items, wherein the category of the single intended transaction is entered on a mobile application or a web-based application under the control of the user by the user, and wherein each of the payment authorization requests is received from the mobile application or the web-based application; and
in response to receipt of a payment authorization request of the plurality of payment authorization requests comprising the manually selected category of the single intended transaction from the user, allocating funds to a debit card solely for the single intended transaction,
wherein the debit card is configured to reject all attempts at purchases other than those for which a payment authorization request is made that comprises a manually selected category of the intended transaction, and
wherein each successful transaction using the debit card requires a separate sequence in which a payment authorization request comprising a category manually selected by the user from the plurality of spending categories is received prior to each successful transaction such that the debit card defaults to an inactive status and/or a zero balance and is only activated temporarily for the intended transaction within the category manually selected by the user to allow the user to complete the intended transaction.

9. The method of claim 8, wherein the step of in response to receipt of the payment authorization request comprising the category of the single intended transaction from the user, allocating funds to the debit card solely for the single intended transaction comprises temporarily allocating funds to the debit card solely for the single intended transaction.

10. The method of claim 9, wherein the step of temporarily allocating funds to the debit card solely for the single intended transaction comprises temporarily allocating funds to the debit card solely for the single intended transaction for a predetermined time period.

11. The method of claim 10, wherein the predetermined time period is no more than one hour.

12. The method of claim 11, wherein the predetermined time period is one hour.

13. The method of claim 8, further comprising receiving at least one spending threshold associated with at least one of the plurality of spending categories from the user.

14. The method of claim 13, further comprising receiving a spending threshold for each of the plurality of spending categories from the user.

15. A system for improving spending habits, comprising:
one or more processors;
a computer readable memory operably coupled with the one or more processors;
a receiver module configured to electronically receive a payment authorization request from a user, the payment authorization request comprising a category manually selected by the user from a plurality of categories and a threshold amount of an intended transaction; and
an authorization module configured to repeatedly activate a debit card under control of the user and/or allocate funds to the debit card for each intended transaction within a manually selected category temporarily, wherein the authorization module is further configured to automatically deactivate the debit card and/or deallocate the funds associated with each intended transaction each time that the user has failed to select a category for the intended transaction or failed to select a threshold amount of the intended transaction such that the debit card repeatedly defaults to an inactive status and/or a zero balance, is repeatedly activated separately for each intended transaction temporarily, and cannot be used for any purchases without having a category manually selected by the user.

16. The system of claim 15, wherein the authorization module is configured to temporarily activate a debit card under control of the user and/or temporarily allocate funds to the debit card for the intended transaction, and wherein the authorization module is further configured to automatically deactivate the debit card and/or deallocate the funds associated with the intended transaction in the event that the user has failed to select a category for the intended transaction, failed to select a threshold amount of the intended transaction, or failed to complete the intended transaction within a predetermined time period.

17. The system of claim 16, wherein the predetermined time period is no more than one hour.

18. The system of claim 15, wherein the system further comprises a remote server, and wherein the remote server comprises the one or more processors.

19. The system of claim 15, wherein the system further comprises a mobile application running on a mobile wireless computing device.

20. The system of claim 15, wherein the system further comprises a web-based application under control of the user.

* * * * *